J. E. RICH.
FARM IMPLEMENT.
APPLICATION FILED OCT. 27, 1919.
1,351,063.
Patented Aug. 31, 1920.
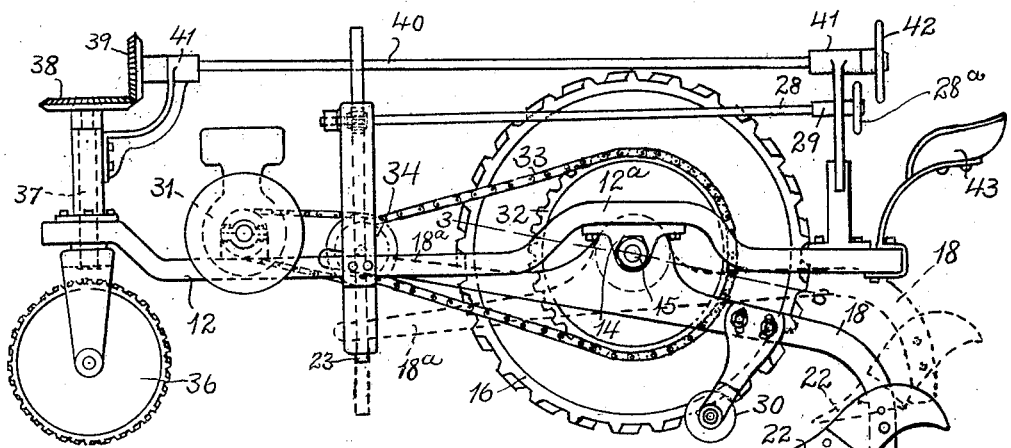
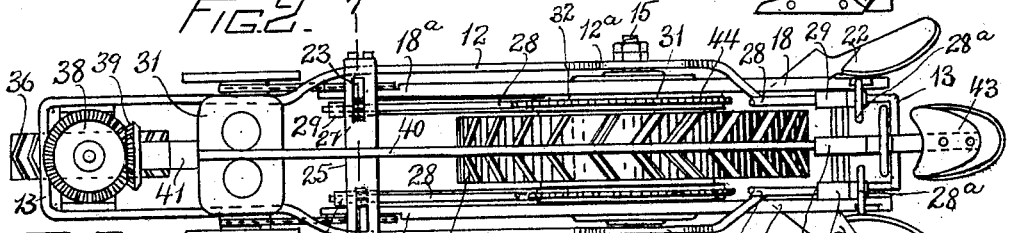
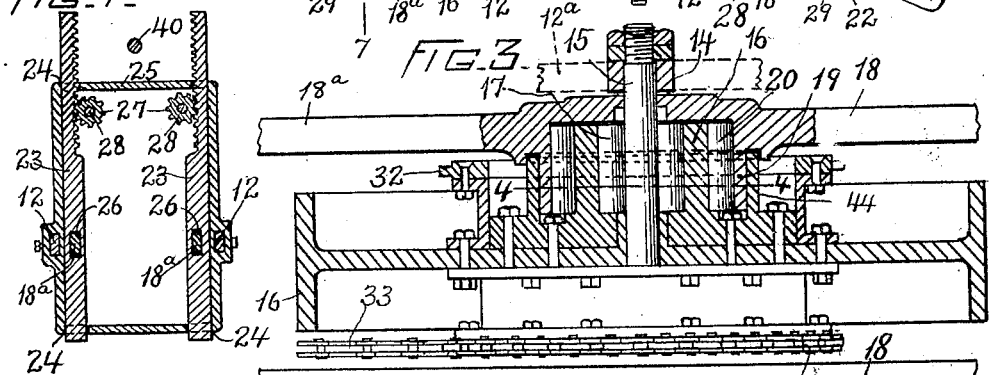
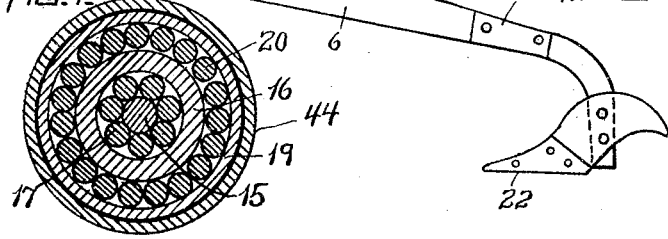
INVENTOR:
J. E. Rich
ATTYS.

UNITED STATES PATENT OFFICE.

JAMES E. RICH, OF SPRINGFIELD, MASSACHUSETTS, ASSIGNOR TO LIBERTY IGNITION COMPANY, OF BOSTON, MASSACHUSETTS, A CORPORATION OF MASSACHUSETTS.

FARM IMPLEMENT.

1,351,063.   Specification of Letters Patent.   Patented Aug. 31, 1920.

Application filed October 27, 1919. Serial No. 333,440.

*To all whom it may concern:*

Be it known that I, JAMES E. RICH, a citizen of the United States, residing at Springfield, in the county of Hampden and State of Massachusetts, have invented new and useful Improvements in Farm Implements, of which the following is a specification.

This invention relates to a farm implement comprising a frame supported by wheels preferably including a motor-driven rear or tractor wheel and a steering wheel, and provided with a working member, such as a plowshare or a pair of plowshares, adapted to be manually raised and lowered relatively to the frame by an operator riding thereon.

The invention is embodied in the improvements hereinafter described and claimed, relating to the means for carrying the working member or members, and to the construction of the rear wheel.

Of the accompanying drawings forming a part of this specification,—

Figure 1 is a side elevation of a farm implement embodying the invention.

Fig. 2 is a top plan view of the same.

Fig. 3 is an enlargement of a portion of Fig. 2, parts being shown in section on the plane of line 3—3 of Fig. 1.

Fig. 4 is a section on line 4—4 of Fig. 3.

Fig. 5 is a side view of one of the draft beams and working members hereinafter described.

Fig. 6 is a section on line 6—6 of Fig. 5.

Fig. 7 is a section on line 7—7 of Fig. 2.

The same reference characters indicate the same parts in all of the figures.

The frame of the machine includes longitudinal side members 12, 12, and transverse end members 13, 13, suitable additional intermediate transverse members being employed, if desired. The side members 12 are preferably provided with raised offset portions 12ª, to which are suitably secured downwardly projecting ears 14, which are apertured to receive a transverse axle 15.

16 represents a rear supporting wheel, which is journaled to rotate on the axle 15, the wheel being preferably provided with annular hubs 16 projecting from its opposite sides. Said hubs are concentric with and spaced from the axle 15, roller bearings 17 being inserted between the hubs and the axle.

Mounted to oscillate on the center formed by the axle 15, are two draft beams 18 which are alike in construction, so that a description of one will suffice.

The draft beam 18 is preferably provided with an annular hub 19, which is concentric with and spaced from the corresponding wheel hub 16, roller bearings 20 being preferably interposed between the hubs 16 and 19. The draft beam is provided with an orifice 21 concentric with the hub 19, through which the axle 15 passes. The draft beam projects rearwardly from the axle, and its rear end portion is curved downwardly and is provided with a working member, such as a plowshare 22, which may be of any suitable form.

The draft beam is provided with a forwardly projecting extension 18ª, which constitutes a lever whereby the beam may be oscillated in a vertical plane to raise and lower the member 22, manually operable means being provided for swinging the lever 18ª. As here shown, I have embodied said means in a rack bar 23 vertically movable in slots 24 in a frame part 25 fixed to the frame bars 12 and provided with a slot 26 through which the forward end portion of the lever 18ª extends loosely. A pinion 27 on a shaft 28 meshes with the teeth of the rack bar 23. The shaft 28 is journaled in fixed bearings 29 on the frame, and is provided with a hand wheel 28ª. Rotation of the shaft 28 by the operator raises or lowers the rack bar 23 and correspondingly swings the lever 18ª to raise or lower the draft beam 18 and its working member. It will now be seen that the draft beam oscillates and the rear wheel rotates, on a center common to both, and that the beam 18 and lever 18ª project in opposite directions from said center. It will also be seen that the rack bar 23 and pinion 27 constitute elements of means for preventing swinging movements of the beam 18 and its lever, excepting by rotation of said pinion.

The described arrangement, therefore, prevents the frame and rear wheel from being lifted by pressure of the working member against the soil in the usual operation of the machine, it being evident that lifting pressure on the working member at one side of the center of oscillation is counteracted by the described connections between the lever 18ª and the frame of the machine, at the opposite side of said center.

The draft beam is preferably provided with a disk colter 30, adapted to cut a slit in advance of the cutting edge of the plowshare.

As best shown by Fig. 2, two plowshares 22 are preferably employed, the mold-boards facing in opposite directions. When one plowshare is in use, the other is elevated, each draft beam being provided with independent manually operated raising and lowering means.

A gasolene or other motor 31 may be mounted on the forward portion of the frame, and is connected with the rear wheel by suitable driving connections which, as here shown, include sprocket wheels 32 fixed to the wheel, and sprocket chains 33 connecting the wheels 32 with other sprocket wheels 34 driven by the engine.

The rear wheel 16 supports the rear portion of the frame, and the forward portion is supported by a steering wheel 36, journaled in the forks of a steering post 37, suitable means being employed to turn the said post and steering wheel. As here shown, the post 37 is provided with a bevel gear 38 meshing with a bevel gear 39 on the shaft 40, journaled in fixed bearings 41 on the frame and provided with a hand wheel 42 within reach of the occupant of a seat 43.

Preferably the rear wheel is provided with an annular flange 44, surrounding the hub 19 of the draft beam, and constituting a dust guard.

The chief stresses and strains incident to the operation of the machine are sustained by the rear wheel and its hubs 16, no injurious stresses and strains being communicated to the frame of the machine from the working members and draft beams.

As implied in the foregoing description and in the following claims, I am not limited to the specific mechanism of the preferred embodiment of my improvements shown by the drawings, except as otherwise required in certain of the more limited claims.

I claim:

1. A farm implement, comprising a frame having a transverse axle, a wheel journaled to rotate on said axle and supporting a portion of the frame, a draft beam mounted to oscillate on a center formed by said axle, and extending rearwardly and downwardly therefrom, a working member carried by said draft beam, a lever fixed to and constituting a forwardly projecting extension of the draft beam, and manually operable means carried by the frame for swinging said lever to raise and depress the draft beam and the working member carried thereby, said means being organized to counteract lifting pressure exerted on the working member.

2. A farm implement substantially as specified by claim 1, the said manually operable means including a rack bar vertically movable in fixed guides on the frame and loosely engaged with said lever, and a shaft journaled in fixed bearings and provided with a pinion meshing with the teeth of the rack bar.

3. A farm implement, comprising a frame having a transverse axle, a wheel journaled to rotate on said axle and supporting a portion of the frame, a pair of draft beams located at opposite sides of the wheel and extending rearwardly and downwardly from said axle, each draft beam being mounted to oscillate on a center formed by the axle, and provided with a working member, levers fixed to and constituting forwardly projecting extensions of the draft beams, and manually operable means carried by the frame for swinging said levers independently to raise and depress the draft beams and the working members carried thereby, said means being organized to counteract lifting pressure exerted on the working members.

4. A farm implement of the character stated, comprising a frame having a transverse axle, a wheel having annular hubs projecting from opposite sides of the wheel and concentric with the axle, a pair of draft beams located at opposite sides of the wheel and having annular hubs surrounding and concentric with the wheel hubs, said wheel hubs constituting centers on which the draft beams are oscillatable, working members carried by the draft beams, levers fixed to and constituting forwardly projecting extensions of the draft beams, and manually operable means carried by the frame for swinging said levers and draft beams independently.

In testimony whereof I have affixed my signature.

JAMES E. RICH.